United States Patent
Mazziotti

(10) Patent No.: US 7,628,705 B2
(45) Date of Patent: Dec. 8, 2009

(54) JOINT SEAL

(76) Inventor: Philip Mazziotti, 2826 Falmouth Rd., Toledo, OH (US) 43615; Michele Mazziotti, legal representative, 2826 Falmouth Rd., Toledo, OH (US) 43615

( * ) Notice: Subject to any disclaimer, the term of this patent is extended or adjusted under 35 U.S.C. 154(b) by 288 days.

(21) Appl. No.: 10/564,072

(22) PCT Filed: Jul. 9, 2004

(86) PCT No.: PCT/US2004/021916

§ 371 (c)(1),
(2), (4) Date: Jul. 3, 2006

(87) PCT Pub. No.: WO2005/008090

PCT Pub. Date: Jan. 27, 2005

(65) Prior Publication Data

US 2007/0293328 A1    Dec. 20, 2007

Related U.S. Application Data

(60) Provisional application No. 60/485,960, filed on Jul. 10, 2003.

(51) Int. Cl.
*F16D 3/84* (2006.01)
(52) U.S. Cl. ........................ 464/171; 180/346
(58) Field of Classification Search ................ 464/170, 464/171, 176; 277/346; 74/609; 180/84, 180/346; 280/159
See application file for complete search history.

(56) References Cited

U.S. PATENT DOCUMENTS

| 1,009,778 A | 11/1911 | Newman |
|---|---|---|
| 1,167,455 A | 1/1916 | Watts |
| 1,253,108 A | 1/1918 | Taylor |
| 1,294,583 A | 2/1919 | Whisler |
| 1,330,051 A | 2/1920 | Berardinelli et al.. |
| 1,378,985 A | 5/1921 | Thiemer |
| 1,543,575 A | 6/1925 | Kishline |
| 1,670,175 A | 5/1928 | Wikoff |
| 1,714,742 A | 5/1929 | Urschel |
| 1,797,215 A | 3/1931 | Williams |
| 1,887,106 A | 11/1932 | Shierk |
| 2,037,947 A | 4/1936 | Swenson |
| 2,074,703 A | 3/1937 | Nelson |

(Continued)

FOREIGN PATENT DOCUMENTS

SU           632843 A       11/1978

*Primary Examiner*—Greg Binda
(74) *Attorney, Agent, or Firm*—David C. Purdue

(57) ABSTRACT

A joint seal for torque transmitting joints is disclosed. The joint seal comprises a first seal ring, a second seal ring and a non-flexible seal housing having first and second ends. The first end of the seal housing includes a ring seal surface for engaging and sealing against an outer sealing surface on the first seal ring. The first ring seal includes an inner sealing surface for engaging and sealing against an outer surface of an outer race or some other component associated with a driven shaft of the joint. The second end of the non-flexing seal housing includes a ring seal surface for engaging and sealing against an outer sealing surface on the second seal ring. The second seal ring includes an inner sealing surface for engaging and providing a sliding seal against a driving shaft or some other component associated with a driving shaft of the joint.

12 Claims, 4 Drawing Sheets

U.S. PATENT DOCUMENTS

| | | |
|---|---|---|
| 2,211,388 A | 8/1940 | Salvetti |
| 2,546,298 A | 3/1951 | Browning |
| 2,574,226 A | 11/1951 | Sampson |
| 2,902,843 A | 9/1959 | Forbes |
| 3,177,683 A | 4/1965 | Olson |
| 3,418,828 A | 12/1968 | Le Roy Carns |
| 3,543,536 A | 12/1970 | Rekow |
| 4,238,936 A | 12/1980 | Devos |
| 4,385,677 A | 5/1983 | Sowers |
| 4,435,166 A | 3/1984 | Bondioli |
| 4,605,332 A | 8/1986 | Mayhew et al. |
| 4,627,826 A | 12/1986 | Juziuk et al. |
| 5,007,881 A | 4/1991 | Hazebrook |
| 5,971,858 A | 10/1999 | Aurora |
| 6,368,224 B1 | 4/2002 | Knodle et al. |

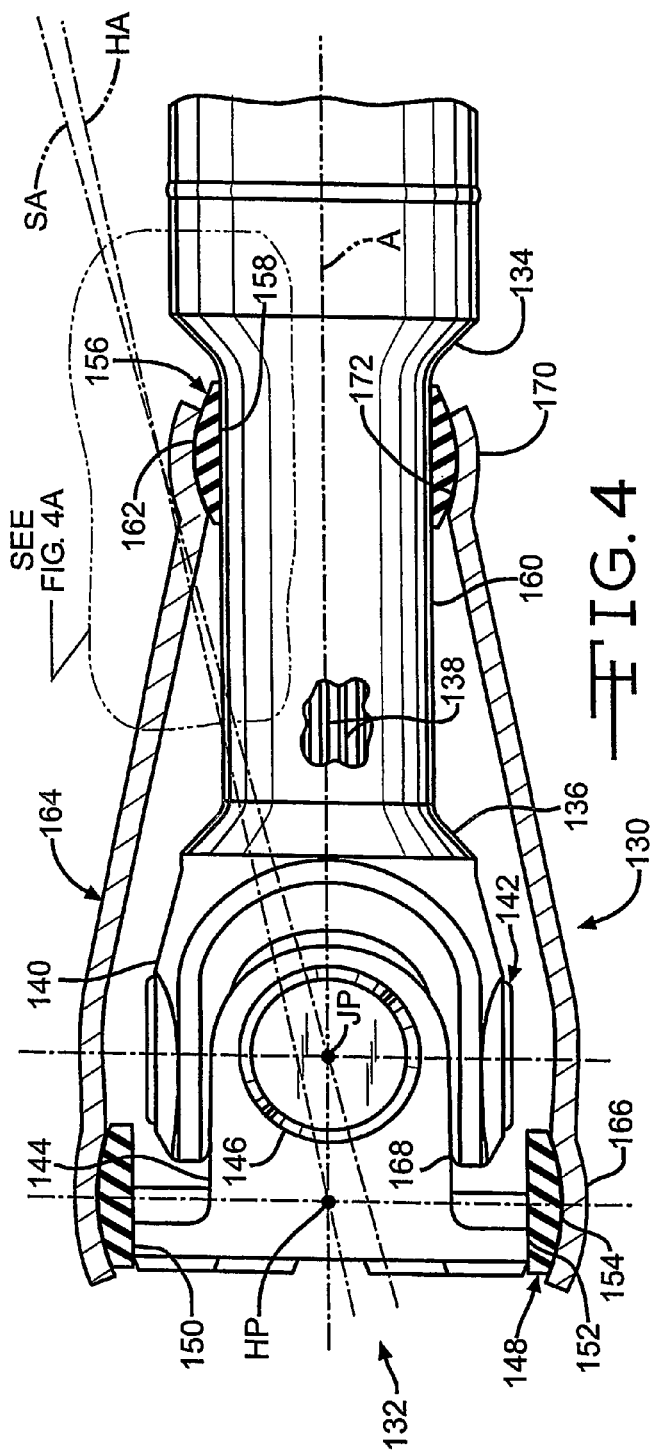

JOINT SEAL

BACKGROUND OF THE INVENTION (1) Field of the Invention

The present invention relates generally to seals for torque transmission joints and especially to non-flexing seals for such joints.

(2) Description of Related Art Including Information Disclosed Under 37 CFR 1.97 and 37 CFR 1.98

Torque transmitting joints are used in a wide variety of applications and especially in vehicle applications. Such joints generally transmit torque from an input shaft to an output shaft. Examples of well-known torque transmitting joints include universal ("U") joints, constant velocity ("CV") joints and Cardan joints although there are many other joints to which the present invention can be applied. In most cases, it is preferred that such joints be sealed to protect the moving parts from dirt and debris that might contaminate the joints and, in some cases, to keep grease or another lubricant next to the moving parts. For example, CV joints are typically sealed with flexible, accordion-style boots that keep dirt out and grease in contact with the moving parts. Because such seals are flexible, they are, necessarily, not very rugged and are prone to failure. When such seals fail, grease escapes and leaves the joints to run dry which quickly leads to joint failures. Upwards of ninety percent of CV joint failures are attributable to failure of flexible boot seals and the consequent loss of lubricant.

During a search of US patents directed to patents disclosing non-flexing joint seals, the following US patents were noted: No. 1,009,778; No. 1,167,455; No. 1,253,108; No. 1,294,583; No. 1,330,051; No. 1,378,985; No. 1,543,575; No. 1,670,175; No. 1,714,742; No. 1,797,215; No. 1,887, 106; No. 2,037,947; No. 2,074,703; No. 2,211,388; No. 2,546,298; No. 2,574,226; No. 2,902,843; No. 3,418,828; No. 3,543,536; No. 4,238,936; No. 4,385,677; No. 4,435, 166; No. 4,605,332; No. 4,627,826; No. 5,007,881; No. 5,971,858 and No. 6,368,224.

BRIEF SUMMARY OF THE INVENTION

The present invention is an improved non-flexing type joint seal for torque transmitting joints. The joint seal comprises a first seal ring, a second seal ring and a non-flexing seal housing having first and second ends. The first end of the seal housing includes a seal ring surface for engaging and sealing against an outer sealing surface on the first seal ring. The first seal ring includes an inner sealing surface for engaging and sealing against an outer surface of an outer race or some other component associated with a drive shaft of the joint. The second end of the non-flexing seal housing includes a seal ring surface for engaging and sealing against an outer sealing surface on the second seal ring. The second seal ring includes an inner sealing surface for engaging and sealing against a driven shaft or some other component associated with a driven shaft of the joint. In joints which accommodate axial displacement, as between a drive shaft and a driven shaft, the inner sealing surface of the first seal ring or of the second seal ring effects a sliding seal so that one of the two seal rings can move axially with respect to the drive shaft or the driven shaft.

Accordingly, it is an object of the present invention to provide non-flexing, longer lasting seal for a torque transmitting joint.

It is a further object of the invention to provide a non-flexing joint seal that is essentially maintenance free.

It is a further object of the present invention to provide a non-flexing joint seal that is easy to install.

These and other objects and advantages of joint seals according to the present invention will be fully appreciated by those skilled in the art upon reviewing the disclosures herein.

BRIEF DESCRIPTION OF THE SEVERAL VIEWS OF THE DRAWING

FIG. 4 is a side view, partially in cross-section, of Cardan type joint including a sliding spline slip joint and a non-flexible seal according to the present invention.

FIG. 4a is an enlarged view of a portion of the non-flexible seal shown in FIG. 4 wherein the output shaft isn't axially aligned with the input shaft.

FIG. 5 is a detailed cross-sectional view of a seal ring suitable for use in a non-flexible seal according to the present invention.

DETAILED DESCRIPTION OF THE PREFERRED EMBODIMENTS

Figure 1:
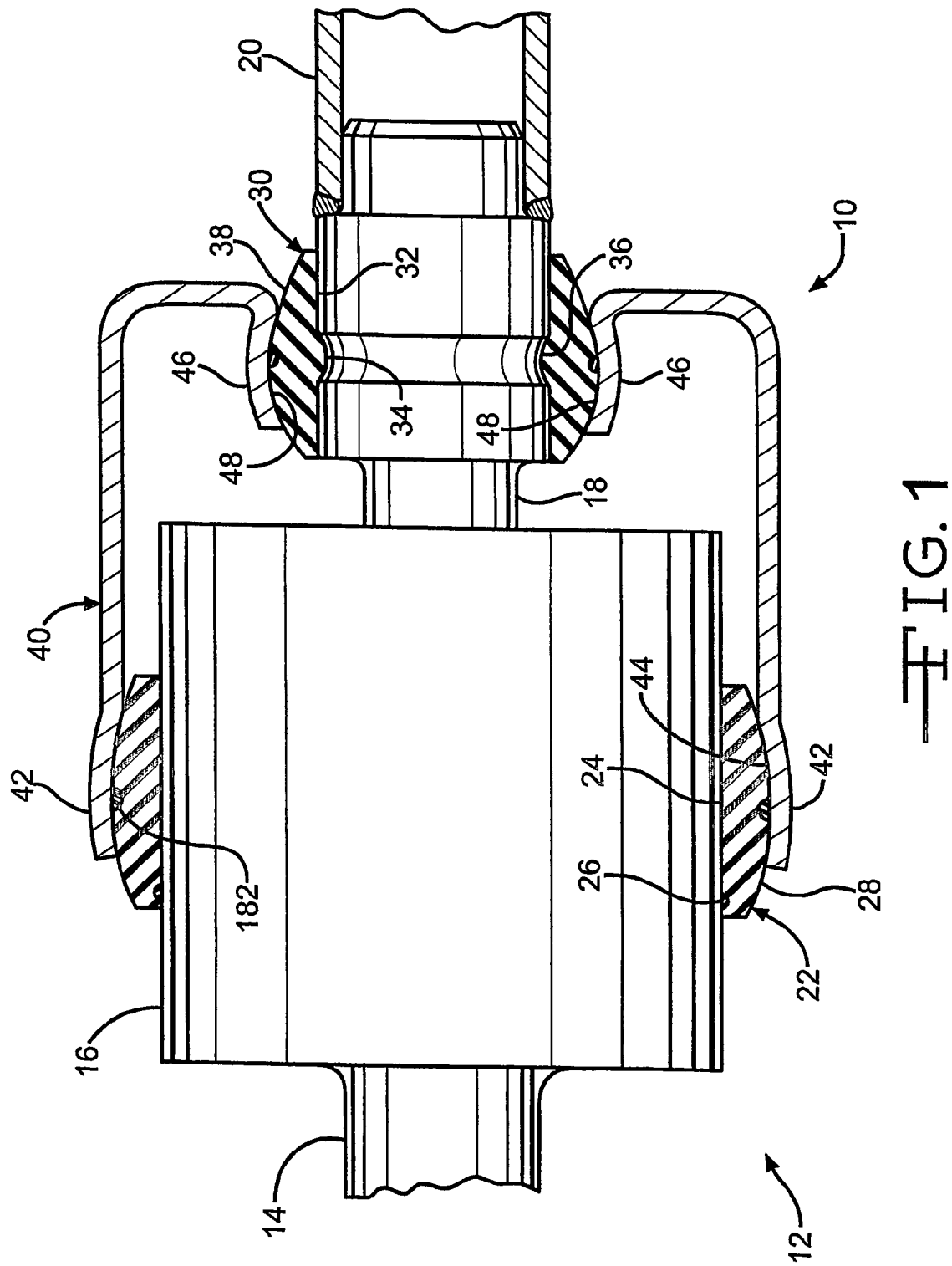
FIG. 1 is a side view, partially in cross-section, of an inner, low angle, plunger type CV joint with a non-flexible seal according to the present invention.

Referring now to FIG. 1, a non-flexible joint seal is indicated generally at 10, as applied to an inner, low-angle, plunger type CV joint indicated generally at 12. The CV joint 12 comprises a drive shaft 14 that is connected to an outer race support 16 and a driven shaft 18 that is connected to an inner race (not shown) so that torque from the drive shaft 14 is transmitted through the joint 12 to the driven shaft 18 and, typically, to an axle shaft or half shaft 20. The seal 10 is also suitable for use with a low angle axially fixed (non-plunger type) CV joint (not shown).

The seal 10 comprises a first seal ring 22 having an inner sealing surface 24 that abuts an outer surface of the outer race support 16 and creates a seal between the outer surface of the outer race support 16 and the seal ring 22. This is a sliding seal in that the outer surface of the outer race support 16 can slide axially in either direction relative to the seal ring 22 to accommodate axial displacement between the drive shaft 14 and the driven shaft 18. An O ring 26 may be provided in a groove formed in the inner sealing surface 24 to enhance the seal created between the first seal ring 22 and the outer race support 16. The first seal ring 22 has an outer sealing surface 28.

The seal 10 further comprises a second seal ring 30 having an inner sealing surface 32 that abuts an outer surface of the driven shaft 18 and creates a seal between the outer surface of the driven shaft 18 and the seal ring 30. This is an axially static seal in that the seal ring 30 is prevented from sliding axially in either direction along the outer surface of the driven shaft by engagement between an annular ridge 34 that extends inwardly from the inner sealing surface 32 of the seal ring 30 and an annular groove, indicated at 36, formed on the outer surface of the driven shaft 18. The second seal ring 30 has an outer sealing surface 38.

Excellent results have been obtained with first and second seal rings composed of neoprene having a Shore A durometer hardness in the range of 90 to 95. Other suitable materials for the seal rings include, but are not limited to, thermoplastic elastomers, thermoset rubbers, elastomeric materials, polymeric materials and some composite materials. Polyethylene and polypropylene are well-suited for malting seal rings. The seal rings need to be semi-flexible with enough flexibility to facilitate their assembly into a seal according to the invention, which is described in some detail below, yet rigid enough to support a seal housing, relative to a joint, as described below.

The seal 10 further comprises a non-flexible housing indicated generally at 40. Excellent results have been achieved with a non-flexible housing machined from steel to have a wall thickness of about fifty thousandths of an inch. Thicker and thinner wall thicknesses will be suitable in many applications. In this specification, "non-flexible" is used to refer to a housing that is rigid, but not in the pure mechanical sense meaning an imaginary body that is so rigid that, regardless of the force applied to the body, the relative positions of two spaced points in the body do not change. Rather, "non-flexible" is used herein to refer to a housing that would not be elastically deformed by manual manipulation and to distinguish such a housing from a housing made, for example, of an elastomeric material such that the housing was flexible as in prior art flexible CV joint boots. The degree to which the housing 40 must be non-flexible will be further discussed below with regard to the function of the housing 40.

The housing 40 extends entirely around the CV joint 12 and has a first open end that is defined by a first seal ring portion 42 having a first seal ring surface 44. The housing 40 has a second open end that is defined by a second seal ring portion 46 having a second seal ring surface 48. The first seal ring surface 44 has a curvature that is complimentary to the curvature of the outer sealing surface 28 of the first seal ring 22. In the embodiment shown in FIG. 1, the outer sealing surface 28 and the first seal ring portion 42 constitute a partial ball and socket joint, with the seal ring 22 held captive within the seal ring portion 42. The housing 40 can pivot relative to the first seal ring 22 but the housing 40 must be non-flexible to the extent that the first seal ring portion 42 maintains its socket relationship with the seal ring 22 and axial displacement between the two is substantially prevented.

The second seal ring surface 48 has a curvature that is complimentary to the curvature of the outer sealing surface 38 of the second seal ring 30. In the embodiment shown in FIG. 1, the outer sealing surface 38 and the second seal ring portion 46 constitute a partial ball and socket joint, with the seal ring 30 held captive within the seal ring portion 46. The housing 40 can pivot relative to the second seal ring 30 but the housing 40 must be non-flexible to the extent that the second seal ring portion 46 maintains its socket relationship with the seal ring 30 and axial displacement between the two is substantially prevented.

When the drive shaft 14 and the driven shaft 18 are axially aligned, as shown in FIG. 1, the housing 40 will be supported by the seal rings 22 and 30, relative to the joint 12, in the manner shown in FIG. 1. If the drive shaft 14 and the driven shaft 18 are displaced from the axially aligned position shown in FIG. 1 to a position (not shown) where the axes of the shafts are not axially aligned, the housing 40 will pivot, relative to the seal ring 22 and the seal ring 30, as required, to accommodate the skew between the axes of the shafts 14 and 18. If the driven shaft 18 moves axially a given distance to the left in FIG. 1 relative to the drive shaft 14, the seal ring 22 will be displaced axially to the left a like distance along the outer race support 16 because (a) the housing 40 is fixed axially relative to the driven shaft 18 through the seal ring 30 which, in turn, is axially fixed on the driven shaft 18 through the ridge 34 and (b) the seal ring portion 46 of the housing 40, through engagement with the outer sealing surface 38 of the second seal ring 30, is fixed axially with respect to the second seal ring 30. Thus, the housing 40 can accommodate axial and angular displacements as between the drive shaft 14 and the driven shaft 18 while maintaining a sealing relationship with the CV joint 12.

The seal rings 22 and 30, as mentioned above, are preferably formed of a relatively hard rubber or rubber like material that has some flexibility. This provides good service life and facilitates the assembly of the seal housing on a joint. The seal ring 22, for example, can be manually squeezed along opposed portions of the outer sealing surface 22 so that it assumes an oval shape instead of its normal ring shape and one of the ends of the oval can be inserted into the seal ring portion 42 of the housing. The seal ring can then be released so that, as it returns to its ring shape, opposed portions of the outer sealing surface 28 engages the first seal ring surface 44 of the housing 40. The seal ring 22 can then be pivoted until a portion of the outer sealing surface 28 engages the entire first seal ring surface 44 of the housing 40. The same procedure can be utilized to seat the second seal ring 30 in the seal ring portion 46 of the housing 40. The second seal ring 30 can then be slid onto the driven shaft 18, before it is assembled into the CV joint 12, until the ridge 34 engages groove 36 in the driven shaft. Then, as the driven shaft is assembled into the CV joint 12, the seal ring 22 can be slid onto and over the outer race support 16.

Figure 2:
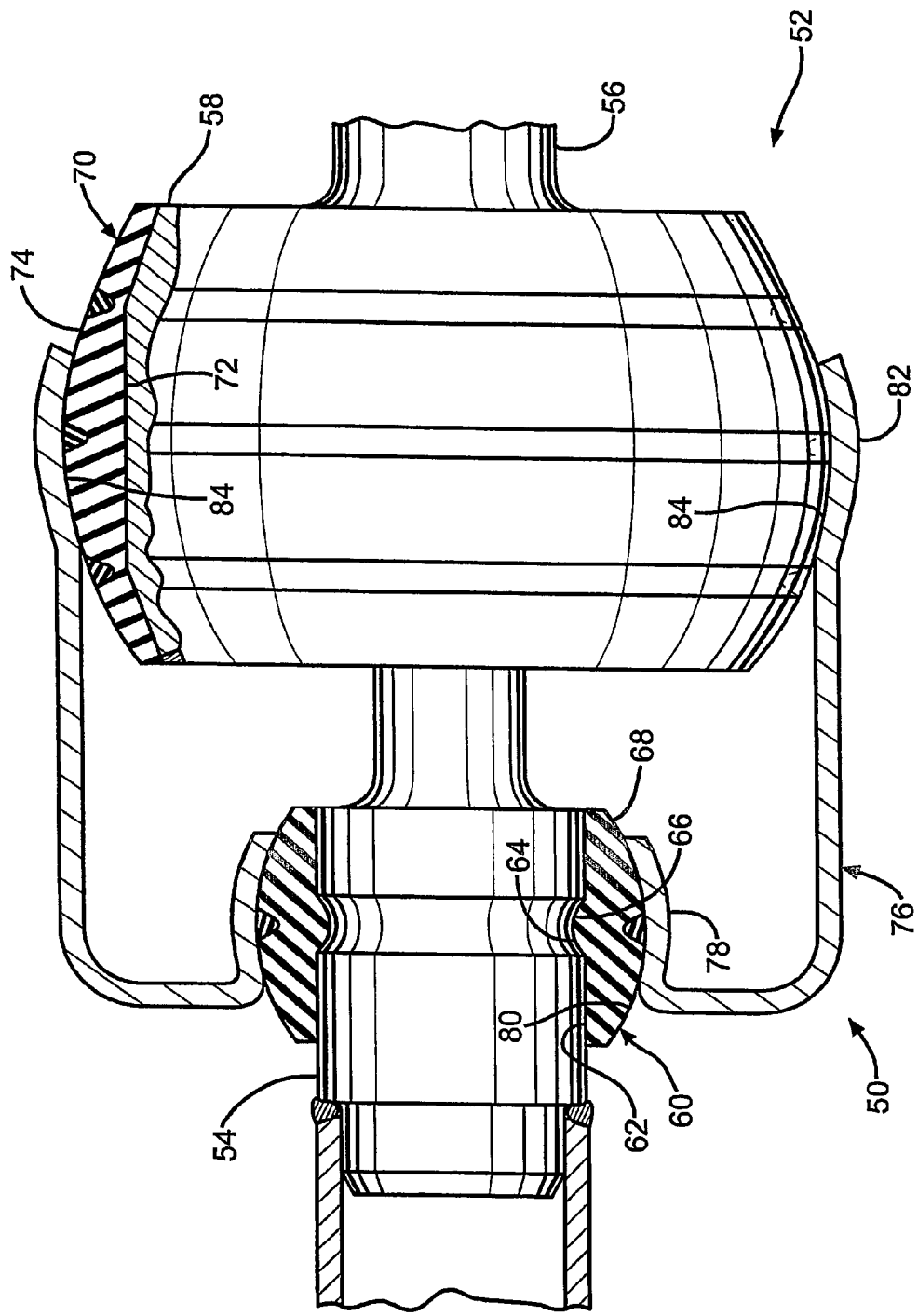
FIG. 2 is a side view, partially in cross-section, of an outer, high angle, axially fixed CV joint with a non-flexible seal according to the present invention.

Referring now to FIG. 2, a non-flexible joint seal according to a second embodiment of the invention is indicated generally at 50 in conjunction with an outer, high angle, axially fixed CV joint 52. The CV joint 52 comprises a drive shaft 54 that is connected to an inner race (not shown) and a driven shaft 56 that is connected to an outer race support 58 so that torque from the drive shaft 54 is transmitted through the joint 52 to the driven shaft 56 and, typically, to a wheel (not shown).

The seal 50 comprises a first seal ring 60 having an inner sealing surface 62 that abuts an outer surface of the drive shaft 54 and creates a seal between the outer surface of the drive shaft 54 and the first seal ring 60. This is an axially fixed seal in that the seal ring 60 is prevented from sliding axially in either direction along the outer surface of the drive shaft 54 by engagement between an annular ridge 64 that extends inwardly from the inner sealing surface 62 of the seal ring 60 and an annular groove, indicated at 66, formed on the outer surface of the drive shaft 54. The first seal ring 60 has an outer sealing surface 68.

The seal 50 further comprises a second seal ring 70 having a compound inner sealing surface 72 that abuts an outer surface of the outer race support 58 and creates a seal between the outer surface of the outer race support 58 and the seal ring 70. This is an axially static seal in that the seal ring 70 is prevented from sliding axially in either direction along the outer surface of the outer race support 58 by engagement between non-cylindrical portions of the outer surface of the outer race support 58 and complimentary portions of the inner sealing surface 72. This engagement maintains the seal ring 70 in a fixed axial location on the outer race support 58. The second seal ring 70 has an outer sealing surface 74. The seal ring materials discussed above are equally suited to the seal rings 60 and 70.

Both seal rings 60 and 70 are shown as being axially fixed and this will work with a joint like the joint 52, which is axially fixed. However, it will be appreciated that the seal ring 60 or the seal ring 70 can be not axially fixed but free to float along the outer surface of the joint part on which they are supported. For example, the groove indicated at 66 and the ridge 64 can be eliminated so that the ring 60 can slide axially relative to the drive shaft 54.

The seal 50 further comprises a non-flexible housing indicated generally at 76. The housing 76 has a first open end that is defined by a first seal ring portion 78 having a first seal ring surface 80. The housing 76 has a second open end that is defined by a second seal ling portion 82 having a second seal ring surface 84. The first seal ring surface 80 has a curvature that is complimentary to the curvature of the outer sealing surface 68 of the first seal ring 60. In the embodiment shown in FIG. 2, the outer sealing surface 68 and the first seal ring portion 78 constitute a partial ball and socket joint, with the seal ring 60 held captive within the seal ring portion 78. The housing 76 can pivot relative to the first seal ring 60 but the housing 76 is non-flexible to the extent that the first seal ring portion 78 maintains its socket relationship with the first seal ring 60 and axial displacement between the two is substantially prevented.

The second seal ring surface 84 has a curvature that is complimentary to the curvature of the outer sealing surface 74 of the second seal ring 70. In the embodiment shown in FIG. 2, the outer sealing surface 74 and the second seal ring portion 82 constitute a partial ball and socket joint, with the seal ring 70 held captive within the seal ring portion 82. The housing 76 can pivot relative to the second seal ring 70 but the housing 76 is non-flexible to the extent that the second seal ring portion 82 maintains its socket relationship with the seal ring 70 and axial displacement between the two is substantially prevented, except to the extent that the resiliency of the seal ring 70 permits some minor relative axial movement therebetween.

When the drive shaft 54 and the driven shaft 56 are axially aligned, as shown in FIG. 2, the housing 76 will be supported by the seal rings 60 and 70, relative to the joint 52, in the manner shown in FIG. 2. If the drive shaft 54 and the driven shaft 56 are angularly displaced from the axially aligned position shown in FIG. 2 to a position (not shown) where the axes of the shafts are not axially aligned, the housing 76 will pivot, relative to the seal ring 60 and the seal ring 70, as required, to accommodate the skew between the axes of the shafts 54 and 56. As mentioned above, the drive shaft 54 and the driven shaft 56 are fixed so as to prevent axial movement between them. The seal 50 can be assembled in the manner described above for the seal 10.

Figure 3:
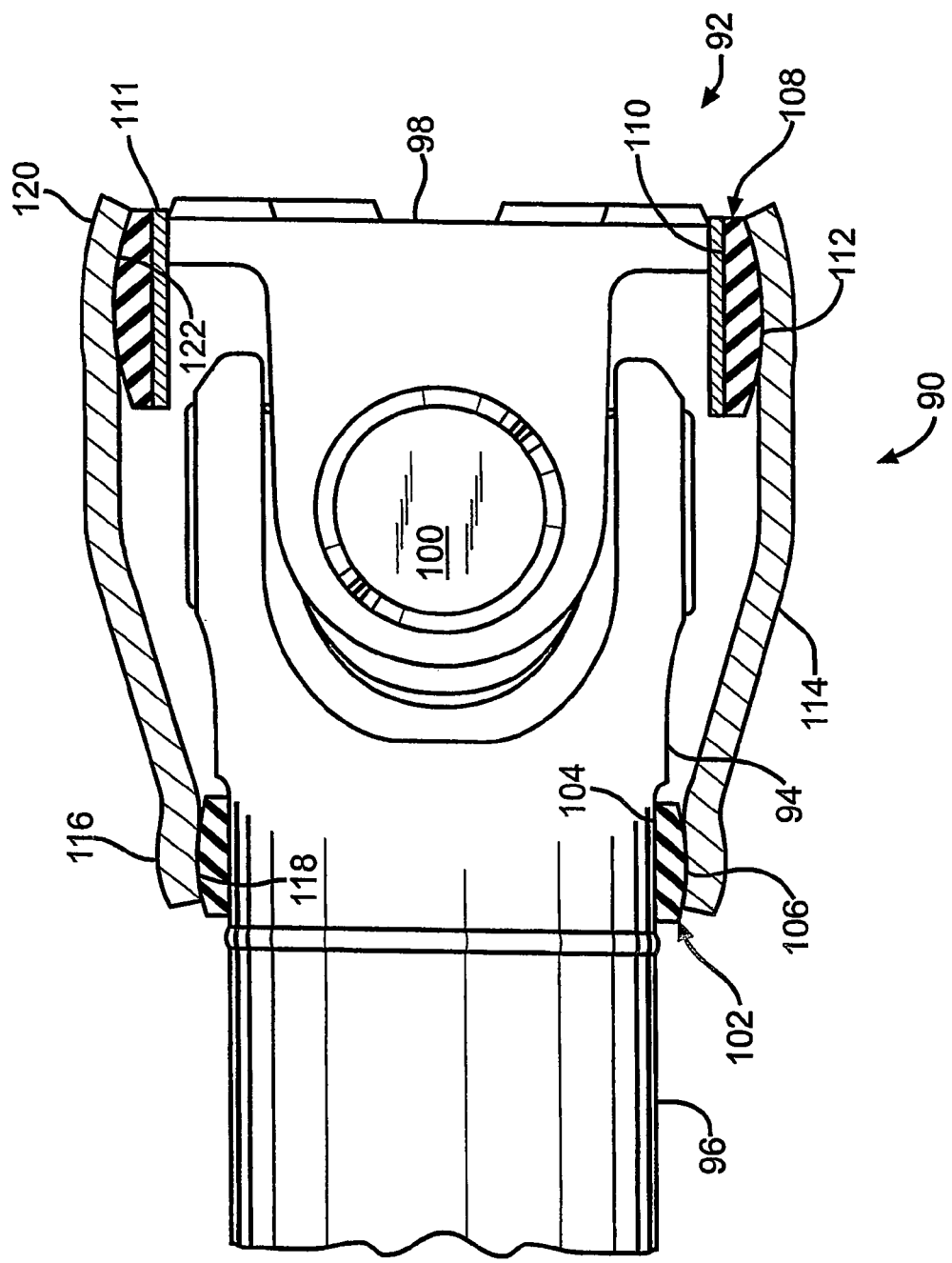
FIG. 3 is a side view, partially in cross-section, of an axially fixed U-joint with a non-flexible seal according to the present invention.

Referring now to FIG. 3, a non-flexible joint seal is indicated generally at 90, as applied to a rear U-joint indicated generally at 92. The U-joint 92 comprises a shaft yoke 94 to which torque is transmitted by a drive shaft 96 and a flange yoke 98. A journal cross 100 connects the yokes 94 and 98 in a known manner so that torque can be transmitted through the U-joint in a known manner.

The seal 90 comprises a first seal ring 102 having an inner surface 104 that abuts an outer surface of the shaft yoke 94 and floats on the shaft yoke 94. The seal ring 102 can float in either axial direction along the outer surface of the shaft yoke 94 to accommodate axial displacement between the shaft yoke 94 and the flange yoke 98. The first seal ring 102 has an outer sealing surface 106. The seal 90 further comprises a second seal ring 108 having an inner sealing surface 110 that abuts a cylindrical sleeve 111 which is press fit on an outer surface of the flange yoke 98. The sleeve 111 supports the seal ring 108 on the flange yoke 98. The ring 110 and the sleeve 111 create a seal between the outer surface of the flange yoke 98 and the inner surface 110 of the seal ring 108. This is an axially static seal in that the seal ring 108 is prevented from sliding axially in either direction along the outer surface of the flange yoke 98 by friction as between the sleeve 111 and the flange yoke 98 and friction between the sleeve 111 and the ring 108. Alternatively, the sleeve 111 might be welded or otherwise secured to the flange yoke 98 and the seal ring 108 might be adhesively secured or heat bonded to the sleeve 111. The second seal ring 108 has an outer sealing surface 112.

The seal 90 further comprises a non-flexible housing indicated generally at 114. The housing 114 has a first open end that is defined by a first seal ring portion 116 having a first seal ring surface 118. The housing has a second open end that is defined by a second seal ring portion 120 having a second seal ring surface 122. The first seal ring surface 118 has a curvature that is complimentary to the curvature of the outer sealing surface 106 of the first seal ring 102. The outer sealing surface 102 and the first seal ring portion 116 constitute a partial ball and socket joint, with the seal ring 102 held captive within the seal ring portion 116. The housing 114 can pivot relative to the first seal ring 102 but the housing 114 must be non-flexible to the extent that the first seal ring portion 116 maintains its socket relationship with the seal ring 102 and axial displacement between the two is substantially prevented.

The second seal ring surface 122 has a curvature that is complimentary to the curvature of the outer sealing surface 112 of the second seal ring 108. The outer sealing surface 112 and the second seal ring portion 120 constitute a partial ball and socket joint, with the seal ring 108 held captive within the seal ring portion 120. The housing 114 can pivot relative to the second seal ring 108 but the housing 114 must be non-flexible to the extent that the second seal ring portion 120 maintains its socket relationship with the seal ring 108 and axial displacement between the two is substantially prevented.

When the shaft yoke 94 and the flange yoke 98 are axially aligned, as shown in FIG. 3, the housing 114 will be supported by the seal rings 102 and 108, relative to the joint 92, in the manner shown in FIG. 3. If the yokes 94 and 98 are angularly displaced from the axially aligned position shown in FIG. 3 to a position (not shown) where the axes of the yokes are not axially aligned, the housing 114 will pivot, relative to the seal ring 102 and the seal ring 108, as required, to accommodate the skew between the axes of the yokes 94 and 98. If the shaft yoke 94 moves axially relative to the flange yoke 98, the first seal ring 102 will float along the outer surface of the shaft yoke 94, as required, to accommodate such axial movement.

The seal rings 102 and 108, as mentioned above, are preferably formed of a relatively hard rubber, polymeric or rubber like material that has some flexibility. This provides good service life and facilitates the assembly of the seal housing on a U-joint. The seal ring 102, for example, can be manually squeezed along opposed portions of the outer sealing surface 106 so that it assumes an oval shape instead of its normal ring shape and one of the ends of the oval can be inserted into the seal ring portion 116 of the housing 114. The seal ring 102 can then be released so that, as it returns to its ring shape, opposed portions of the outer sealing surface 106 engages the first seal ring surface 118 of the housing 114. The seal ring 102 can then be pivoted until a portion of the outer sealing surface 106 engages the entire first seal ring surface 118 of the housing 114. The same procedure can be utilized to seat the second seal ring 108 in the seal ring portion 120 of the housing 114. The first seal ring 102 can then be slid onto the drive shaft 96, before it is assembled into the U-joint 92. Then, when the yokes 94 and 98 are assembled with the journal cross 100 and the drive shaft 96 is connected to the shaft yoke 94, the seal rings 102 and 108 and the housing 114 can be slid, left to right in FIG. 3, until the seal ring 108 seats on the outside of the sleeve 111, which has been previously seated on the yoke flange 98, as shown in FIG. 3.

Referring now to FIGS. 4 and 4a, a non-flexible joint seal is indicated generally at 130, as applied to a Cardan joint indicated generally at 132. The Cardan joint 132 comprises a shaft 134 that is internally splined (not shown) and a shaft 136 that has external splines 138 so that torque in the shaft 134 is transmitted to the shaft 136 and vice-versa and so that axial displacement between the shafts 134 and 136 can be accommodated. The shaft 134 is free to move to the right in FIG. 4, relative to the shaft 136. The shaft 136 is connected to a yoke 140 of a U-joint indicated generally at 142, which includes a second yoke 144 and a journal cross 146 connecting the two yokes 140 and 144. The Cardan joint 132 transmits torque and accommodates angular and axial displacement of the components.

The seal 130 comprises a first seal ring 148 having an inner sealing surface 150 that abuts and seats on an outer surface 152 of the yoke 144 and creates a seal between the outer surface 152 of the yoke 144 and the seal ring 148. This is a static seal in that the seal ring 148 is not free to slide axially along the outer surface 152 of the yoke 144. For example, the seal ring 148 can be melt bonded to the yoke 144 or adhesively secured thereto. Alternatively, a sleeve (not shown) like the sleeve 111 shown in FIG. 3 can be employed to support the seal ring 148 relative to the yoke 144. The first seal ring 148 has an outer sealing surface 154.

The seal 130 further comprises a second seal ring 156 having an inner sealing surface 158 that abuts an outer surface 160 of the shaft 134 and creates a seal between the outer surface 160 and the seal ring 156. This is a sliding seal in that the seal ring 156 can slide axially, relative to the shaft 134, as required to accommodate axial movement of the shaft 134 relative to the shaft 136. In FIG. 4, the shafts 134 and 136 are fully collapsed and can lengthen as the shaft 134 moves to the right in FIG. 4, relative to the shaft 136. As the shaft 134 moves to the right, the seal ring 156 will move along the outer surface 160, maintaining its position relative to the shaft 136. The second seal ring 156 has an outer sealing surface 162.

The seal 130 further comprises a non-flexible housing indicated generally at 164. The housing 164 has a first open end that is defined by a first seal ring portion 166 having a first seal ring surface 168. The housing 164 has a second open end that is defined by a second seal ring portion 170 having a second seal ring surface 172. The first seal ring surface 168 has a curvature that is complimentary to the curvature of the outer sealing surface 154 of the first seal ring 148. The outer sealing surface 154 and the first seal ring portion 166 constitute a partial ball and socket joint, with the first seal ring 148 held captive within the seal ring portion 166. The housing 164 can pivot relative to the first seal ring 148 but the housing 164 must be non-flexible to the extent that the first seal ring portion 166 maintains its socket relationship with the seal ring 148 and axial displacement between the two is substantially prevented.

The second seal ring surface 172 has a curvature that is complimentary to the curvature of the outer sealing surface 162 of the second seal ring 156. The outer sealing surface 162 and the second seal ring portion 170 constitute a partial ball and socket joint, with the second seal ring 156 held captive within the seal ring portion 170. The housing 164 can pivot relative to the second seal ring 156 but the housing 164 must be non-flexible to the extent that the second seal ring portion 170 maintains its socket relationship with the second seal ring 156 and axial displacement between the two is substantially prevented.

When the Cardan joint components are axially aligned, along the axis A, as shown in FIG. 4, the housing 164 will be supported by the seal rings 148 and 156, and axially aligned with the axis A, in the manner shown in FIG. 4. When the Cardan joint 132 is subjected to angular displacement through the U-joint 142, such that the shaft 134 is positioned where its axis coincides with an axis SA, the housing 164 will pivot so that its axis coincides with an axis HA. As the shaft 134 is angularly displaced from where its axis coincides with axis A to where its axis coincides with axis SA, the relative positions between the seal ring 156 and the seal ring portion 170 of the housing 164 change from the relative positions shown in FIG. 4 to the relative positions shown in FIG. 4a. The ball and socket relationship between the seal ring portion 170 and the seal ring 156 accommodates this relative motion while maintain a sealing relationship between the seal ring 156 and the seal ring portion 170 of the housing 164. A similar change in relative positions occurs between the first seal ring 148 and the seal ring portion 166 of the housing 164. As noted above, the shafts 134 and 136 are fully collapsed in FIG. 4 and can lengthen as the shaft 134 moves to the right in FIG. 4, relative to the shaft 136. As the shaft 134 moves to the right, the axial position of the seal ring 156 relative to the shaft 136 will remain constant because axial movement of the seal ring 156 is constrained by the housing 164 and the seal ring 156 will move along the outer surface 160 of the shaft 134. The seal 130 can accommodate axial and angular displacements of the shafts 134 and 136 simultaneously.

It should be noted that, from the position shown in FIG. 4, the Cardan joint components pivot about a point designated JP for joint pivot while the housing pivots about point designated HP for housing pivot. For a given degree of angular displacement of the Cardan joint components, the angular displacement of the housing axis HA will be smaller than the given degree of angular displacement, because of the relative, axially offset positions of the pivot points BP and JP. As a consequence, although angular displacement of the Cardan joint elements causes a similar change in relative positions between the first seal ring 148 and the first seal ring portion 166 and between the second seal ring 156 and the second seal ring portion 170, the change in position occurs to a greater extent in the latter elements than in the former elements due to the fact that the joint pivot JP is closer to the first seal ring 148 than it is to the second seal ring 156.

A seal ring indicated at 174 in FIG. 5 has an inner sealing surface 176 and an outer sealing surface 178. A pair of wiper seal lips 180 extend outwardly from the outer sealing surface 178, with depressions formed on each side of each wiper seal lips 180. The seal ring configuration can be utilized to enhance the seal between a seal ring outer sealing surface and an inner sealing surface of a seal ring portion of a housing in a joint seal according to the present invention. Wiper seal lips (not shown) may also be provided on the inner sealing surface 176 and this is well-suited for seal rings that form a sliding seal with a shaft or other joint component. Other seal enhancement features, including those presently known and those developed hereafter may suitably be employed in seal rings in a joint seal according to the present invention. For example, a seal insert 182 (FIG. 1) may be provided in the first seal ring 22 to enhance the seal between the inner sealing surface 44 of the first seal ring portion 42 and the outer sealing surface 28 of the first seal ring 22. The seal insert 182 can comprise a more easily compressed material than the material which constitutes the seal ring 22 and may, in an uncompressed state, extend beyond the outer sealing surface 28 of the seal ring 22.

The foregoing detailed description of the invention is intended to enable one of ordinary skill in the joint seal art to make and use a joint seal according to the present invention, which is not limited to the detailed descriptions set forth above but only by the scope of the claims appended to this specification.

It will be appreciated that various changes and modifications are possible from the specific details of the invention as described above and shown in the attached drawings without departing from the spirit and scope thereof and that, in its essential details, referring to FIG. 1, it is a seal for sealing around a torque transmitting joint 12 between a driving member 14 and a driven member 20, which are operably connected so that torque is transmitted through the joint from the driving member to the driven member. The seal, which accommodates changes in alignment between the driving member axis and the driven member axis, comprises seal rings 22 and 30, a housing 40, and housing seal rings 42 and 46. The seal rings 22 and 30 have curved outer sealing surfaces 28 and 38 and inner sealing surfaces 24 and 32 that abut and form a sliding seal with outer surfaces of the driving and driven members. The seal ring 30 is prevented from sliding axially in either direction along the outer surface of the driven shaft by engagement between an annular ridge 34 that extends inwardly from the inner sealing surface 32 of the seal ring 30 and an annular groove, indicated at 36, formed on the outer surface of the driven shaft 18. A housing 40, which extends entirely around the joint, has a first open end which contains the housing seal ring 22 and a second open end which contains the second housing seal ring 30. The housing seal rings 42 and 46 have a curvature that is complementary to the curvature of the curved outer sealing surface of the seal rings, and form therewith partial ball and socket joints, in which the seal rings are held captive within the housing seal rings. The housing is inflexible to the extent that, in service, the ball and socket relationships are maintained, and axial displacement between the first and second seal rings is substantially prevented while the housing can pivot relative to the seal rings.

I claim:

1. A seal for sealing around a torque transmitting joint between a driving member and a driven member which are operably connected so that torque is transmitted through the joint from the driving member to the driven member, said seal being one which accommodates changes in alignment between the driving member axis and the driven member axis, said seal comprising
   a first seal ring having an inner sealing surface that abuts and forms a seal with an outer surface of the driving member,
   a second seal ring having an inner sealing surface that abuts and forms a seal with an outer surface of the driven member,
   each of said first and second seal rings having a curved outer sealing surface,
   means operable to prevent one of said first and second seal rings from sliding axially in either direction along the outer surface of the driving member or of the driven member,
   a housing which extends entirely around the joint, said housing having a first open end with a first housing seal ring having a first housing seal ring surface and a second open end with a second housing seal ring with a second housing seal ring surface, said first housing seal ring surface having a curvature that is complementary to the curvature of the curved outer sealing surface of said first seal ring, and forms therewith a partial ball and socket joint, in which said seal ring is held captive within said first housing seal ring, said second housing seal ring surface having a curvature that is complementary to the curvature of the curved outer sealing surface of said second seal ring, and forms therewith a partial ball and socket joint, in which said second seal ring is held captive within said second housing seal ring, said housing being inflexible to the extent that, in service, said ball and socket relationships are maintained, and axial displacement between said first and second seal rings, and said first and second housing seal ring surfaces, respectively, is substantially prevented while said housing can pivot relative to said seal rings.

2. The seal claimed in claim 1 wherein the other one of said first and second seal rings is slidable axially along the outer surface of the driving member or of the driven member.

3. The seal claimed in claim 2 wherein said one of said first and second seal rings has an annular recess in which a complementarily shaped protrusion on the driving member or on the driven member is received to prevent axial sliding movement of that seal ring relative to the driving member or the driven member.

4. The seal claimed in claim 1 wherein both of said first and second seal rings have annular recesses, and a complementarily shaped protrusion on the driving member is received in one of the recesses to prevent axial sliding movement of that seal ring relative to the driving member, while a complementarily shaped protrusion on the driven member is received in the other of the recesses to prevent axial sliding movement of that seal ring relative to the driven member.

5. The seal claimed in claim 1 wherein said one of said first and second seal rings has an annular protrusion which is received in a complementarily shaped recess on the driving member or on the driven member to prevent axial sliding movement of that seal ring relative to the driving member or the driven member.

6. The seal claimed in claim 5 wherein both of said first and second seal rings have annular protrusions, and a complementarily shaped recess on the driving member is received in one of the recesses to prevent axial sliding movement of that seal ring relative to the driving member, while a complementarily shaped recess on the driven member is received in the other of the recesses to prevent axial sliding movement of that seal ring relative to the driven member.

7. A seal for sealing around a torque transmitting joint between a driving member and a driven member, said seal comprising,
   a first seal ring having an inner sealing surface for forming a seal with an outer surface of the driving member,
   a second seal ring having an inner sealing surface for forming a seal with an outer surface of the driven member,
   each of said first and second sealing rings having a curved outer sealing surface and
   a non-flexible housing having
      a first open end having a first housing seal ring surface sealingly engageable with said first seal ring outer sealing surface, said first housing seal ma surface having a curvature that is complementary to the curvature of the curved outer sealing surface of said first seal ring, and forms therewith a partial ball and socket joint, in which said seal ring is held captive within said first housing seal ring, and
      a second open end having a second housing seal ring surface sealingly engageable with said second seal ring outer sealing surface, said second housing seal ring surface having a curvature that is complementary to the curvature of the curved outer sealing surface of said second seal ring, and forms therewith a partial ball and socket joint, in which said second seal ring is held captive within said second housing seal ring, said housing being inflexible to the extent that, in service, said ball and socket relationships are maintained, and axial displacement between said first and second seal rings, and said first and second housing seal ring surfaces, respectively, is substantially prevented while said housing can pivot relative to said seal rings.

8. The seal claimed in claim 7 wherein one of said first and second seal rings is slidable axially along the outer surface of the driving member or of the driven member.

9. The seal claimed in claim 8 wherein the other one of said first and second seal rings has an annular recess in which a complementarily shaped protrusion on the driving member or on the driven member is received to prevent axial sliding movement of that seal ring relative to the driving member or the driven member.

10. The seal claimed in claim 8 wherein the other one of said first and second seal rings has an annular protrusion which is received in a complementarily shaped recess on the driving member or on the driven member to prevent axial sliding movement of that seal ring relative to the driving member or the driven member.

11. The seal claimed in claim 7 wherein both of said first and second seal rings have annular recesses, and a complementarily shaped protrusion on the driving member is received in one of the recesses to prevent axial sliding movement of that seal ring relative to the driving member, while a complementarily shaped protrusion on the driven member is received in the other of the recesses to prevent axial sliding movement of that seal ring relative to the driven member.

12. The seal claimed in claim 7 wherein both of said first and second seal rings have annular protrusions, and a complementarily shaped recess on the driving member is received in one of the recesses to prevent axial sliding movement of that seal ring relative to the driving member, while a complementarily shaped recess on the driven member is received in the other of the recesses to prevent axial sliding movement of that seal ring relative to the driven member.

* * * * *